125,254

UNITED STATES PATENT OFFICE.

CHARLES J. BANDMAN, OF UNION, NEW JERSEY.

IMPROVEMENT IN THE MANUFACTURE OF ARTIFICIAL STONE.

Specification forming part of Letters Patent No. 125,254, dated April 2, 1872.

SPECIFICATION.

*To all whom it may concern:*

Be it known that I, CHARLES JOSEPH BANDMAN, of the town of Union, in the county of Hudson and State of New Jersey, have invented a new and useful Improvement in the Manufacture of Artificial Stone, of which the following is a specification:

My process differs from the ordinary process of making cement-stone, concrete, or béton, in that a portion of the sand and cement is replaced by iron-furnace slags, which in their composition are generally very similar to the Italian pozzuolana—the oldest known natural cement. The slags should contain from forty-five to fifty-five per cent. of silica, and from ten to twenty per cent. of alumina. They should, however, only contain traces of iron and manganese, as any considerable quantity of these would prove injurious. Among the iron-furnace slags which I have found best adapted for my purpose, I will mention those having the composition of Wollastonite, diopside, Labradorite, chytophyllite, hornblende, and pilkarandit.

According to Bruno Kerl, (vide his Handbuch der Metallurgie, vol. 1, page 889,) the last-mentioned slag is, for instance, composed of 46.88 silica; 14.78 alumina; 1.48 oxide of manganese; 1.48 magnesia. Such slags are formed in most high furnaces, yet they may be replaced by other iron slags, even if they are not exactly of the above description.

Since iron slags of the given composition are efficient pozzuolanas of themselves, and since they constitute a refuse material to be had in almost every section of this country, I am enabled to produce by their use a far cheaper artificial stone, and one equally strong and durable with that which is generally produced by a mere mixture of hydraulic limes and sand.

To produce my stone, which I propose to call "Zeolite Artificial Stone" because it resembles the natural zeolite, I first take the iron slag of the quality above described, which, before using, is reduced to an impalpable powder by grinding or sifting, and mix this powder with a plaster of common (or fat) lime, in the proportions named, until a stiff paste is obtained. This mixture is then compounded with sand or other inert material, and when each particle of the latter is coated all over with a film of this matrix, and the mass thoroughly incorporated together, I then add thereto hydraulic lime in the proportion of about one-eighth of the bulk of the compounded mass.

For mixing I use the common mortar-box, if for small quantities, and for large masses a pug-mill.

To produce ornamental work I form molds of plaster of Paris, which may be coated with a solution of shellac to prevent the plaster from adhering to the freshly-made composition.

For large blocks, and those of plain surface, molds may be made of wood or other suitable material.

I am aware that iron-furnace slags have been employed for making artificial stone; but they were not reduced to a finely-powdered state—neither were they mixed with slacked lime before being incorporated with other materials; hence no cement of any hydraulic energy was obtained. If, for instance, the lime is mixed with the cement which it is proposed to employ, and the slag powder introduced afterward, a greatly inferior product is obtained.

I also propose to use only slags which are similar in their chemical composition to Italian pozzuolanas.

What I claim as my invention is—

An artificial stone formed by the process of mixing slaked lime with finely-powdered iron slags, chemically resembling Italian pozzuolana, and incorporating this mixture with hydraulic cement and sand, substantially as described.

In witness whereof I have hereunto signed my name in the presence of two subscribing witnesses.

CHARLES J. BANDMAN.

Witnesses:
A. J. CRAWFORD,
GEO. W. MIATT.